United States Patent
Yamaoka et al.

(10) Patent No.: US 7,270,118 B2
(45) Date of Patent: Sep. 18, 2007

(54) CONTROL APPARATUS OF ENGINE

(75) Inventors: Shiro Yamaoka, Hitachi (JP);
Yoshihiro Sukegawa, Hitachi (JP);
Noboru Tokuyasu, Hitachinaka (JP);
Shinya Igarashi, Naka (JP); Katsuaki Fukatsu, Naka (JP); Takashi Kadohiro, Hikari (JP); Hidefumi Iwaki, Hitachinaka (JP); Takanobu Ichihara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/433,351

(22) Filed: May 15, 2006

(65) Prior Publication Data
US 2007/0000473 A1    Jan. 4, 2007

(30) Foreign Application Priority Data
May 13, 2005    (JP)    ............................... 2005-140559

(51) Int. Cl.
*F02D 41/00*    (2006.01)
*F02M 1/00*    (2006.01)

(52) U.S. Cl. .................. 123/672; 123/434; 123/568.21

(58) Field of Classification Search ................ 123/295, 123/434, 704, 568.21, 568.23, 672
See application file for complete search history.

(56) References Cited

U.S. PATENT DOCUMENTS 6,273,056 B1 *   8/2001   Shirakawa et al. ......... 123/305
6,276,334 B1 *   8/2001   Flynn et al. ................. 123/435
6,286,482 B1 *   9/2001   Flynn et al. ................. 123/435
2003/0140629 A1   7/2003   Shirakawa

FOREIGN PATENT DOCUMENTS

EP    0 924 419 A2    6/1999
JP    2003-286880 A   10/2003

* cited by examiner

*Primary Examiner*—John T. Kwon
(74) *Attorney, Agent, or Firm*—Crowell & Moring LLP

(57) ABSTRACT

In an engine having a premixed combustion mode, an EGR flow rate estimating precision is deteriorated at a transient time, and a torque fluctuation and an exhaust gas deterioration are caused. In an engine control apparatus having a premixed combustion mode and a diffusion combustion mode, a sensor detecting an EGR flow rate is arranged in an EGR flow path of the engine, and a cylinder state of the engine is estimated by using an output value of the sensor detecting the EGR flow rate at a time when the engine is in the premixed combustion mode. Since it is possible to accurately detect the EGR flow rate at the transient time and feed back the EGR flow rate at a high response, it is possible to prevent a torque fluctuation and an exhaust gas deterioration.

18 Claims, 6 Drawing Sheets

CONTROL APPARATUS OF ENGINE

BACKGROUND OF THE INVENTION (1) Field of the Invention

The present invention relates to a technique preferably executing a combustion control at a time of a premixed combustion mode in a control apparatus of an engine having a premixed combustion mode.

(2) Description of Related Art

In a diesel engine, there is considered to employ a premixed combustion mode which burns an air-fuel mixture in a state of premixing the air-fuel mixture as much as possible, and reduces NOx. In order to establish the combustion, a premixed gas is formed by finishing a fuel injection as early as possible in an intake stroke or a compression stroke. On the other hand, in the light of a combustion slapping sound generation due to a sharp ascent of a cylinder internal pressure, ensuring a combustion control robustness or the like, there is considered a method of achieving a premixed combustion mode by introducing a lot of EGR at a time of a low load, and ensuring an ignition lag time on the basis of an intake of an inert gas. At this time, since an EGR rate becomes relatively larger in comparison with a normal diffusion combustion mode time, it is necessary to precisely control an EGR flow rate at a time of the premixed combustion mode or at a time of switching to the premixed combustion mode from the diffusion combustion mode. For example, in patent document 1 (JP-A-2003-286880), there is disclosed a technique which estimates an EGR rate within a cylinder from an oxygen concentration or the like determined on the basis of a signal of an air flow sensor installed in an upstream side of an intake pipe and a signal of a linear $O_2$ sensor installed in an exhaust pipe, and is applied to a control at the time of switching the combustion, in a diesel engine switching a premixed combustion and a diffusion combustion in accordance with the EGR rate.

However, in the invention described in the publication mentioned above, the following problems are generated. In other words, in the engine, since a portion from the installed place of the air flow sensor to the combustion chamber is long, and a volume (a dead volume) equal to or more than a fixed level is provided, a displacement is generated between an EGR amount determined on the basis of a detected air amount and an EGR amount actually sucked into the engine, at a transition time such as a rapid acceleration or deceleration. Further, in a diesel engine using a supercharger, since the supercharger and an intercooler are provided, the displacement is further increased.

Further, an exhaust air sensor such as a linear $O_2$ or the like has a problem in view of a response, and it is hard to feed back a combustion state at several cycles. In other words, in the case that it is necessary to precisely control an ignition combustion at each of the cycles, there is required a new technique for stabilizing the combustion and preventing the exhaust gas (NOx, soot) deterioration, particularly in the transient state or the like.

BRIEF SUMMARY OF THE INVENTION

The present invention is made by taking the problem mentioned above into consideration, and an object of the present invention is to provide an apparatus properly controlling an ignition combustion, in an engine having a premixed compression ignition combustion mode, particularly at a transient time such as an accelerating time, a decelerating time or the like.

The problem mentioned above can be solved by a control apparatus of an engine comprising:

an intake air amount control means for controlling an air amount sucked into the engine;

an EGR flow path coupled to a portion between an exhaust passage and an intake passage of the engine and provided for flowing back a part of an exhaust gas;

an EGR amount detecting means for detecting an EGR amount passing through the EGR flow path;

an EGR amount control means for controlling the EGR amount passing through the EGR flow path;

a fuel supply apparatus supplying a fuel into the engine;

a premixed combustion mode starting a combustion after finishing a fuel injection into each of cylinders of the engine; and a diffusion combustion mode starting the combustion during the fuel injection, wherein the control apparatus estimates a cylinder state of the engine on the basis of an output value of the EGR amount detecting means, at a time when the engine is under the premixed combustion mode.

Further, the problem mentioned above can be solved by a control apparatus of an engine comprising:

an intake air amount control means for controlling an air amount sucked into the engine;

an intake air amount detecting means for detecting the air amount sucked to the engine;

an EGR flow path coupled to a portion between an exhaust passage and an intake passage of the engine and provided for flowing back a part of an exhaust gas;

an EGR amount detecting means for detecting an EGR amount passing through the EGR flow path;

an EGR amount control means for controlling the EGR amount passing through the EGR flow path;

a fuel supply apparatus supplying a fuel into the engine;

a premixed combustion mode starting a combustion after finishing a fuel injection into each of cylinders of the engine; and a diffusion combustion mode starting the combustion during the fuel injection, wherein the control apparatus estimates a cylinder state of the engine on the basis of an output value of the EGR amount detecting means, at a time when the engine is under the premixed combustion mode.

In accordance with the present invention described above, in the engine having the premixed compression ignition combustion mode, it is possible to accurately detect the EGR flow rate and feed back the EGR flow rate at a high response by arranging the detecting sensor detecting the EGR flow rate in the EGR flow path, particularly at the transient time such as the accelerating time, the decelerating time or the like. Accordingly, it is possible to properly control the ignition combustion in the premixed combustion mode, and it is possible to prevent a torque fluctuation and a deterioration of an exhaust gas (NOx, soot).

Other objects, features and advantages of the invention will become apparent from the following description of the embodiments of the invention taken in conjunction with the accompanying drawings.

DETAILED DESCRIPTION OF THE INVENTION

A description will be given below of embodiments in accordance with the present invention with reference to the accompanying drawings.

Figure 1:
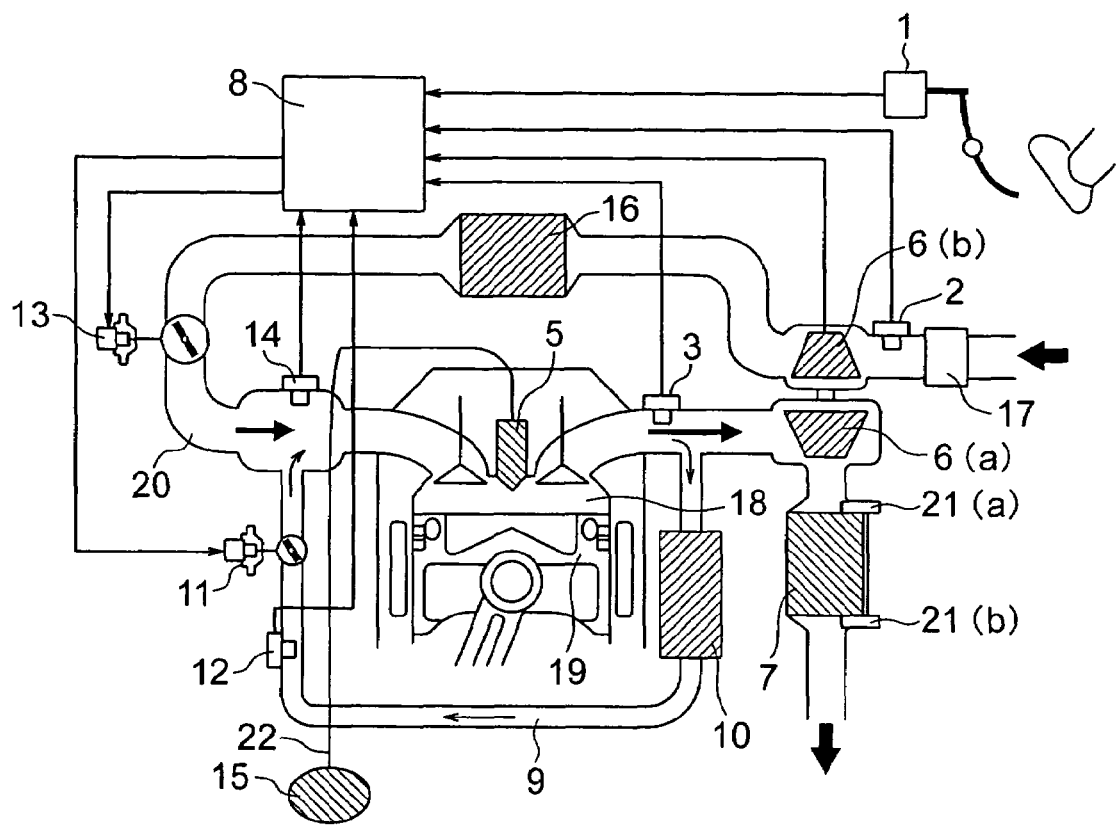
FIG. 1 is a structural view of a control apparatus of an engine in accordance with a first embodiment of the present invention.

FIG. 1 shows a structural view of a control apparatus of an engine in accordance with a first embodiment of the present invention. Reference numeral 19 in FIG. 1 denotes an engine. There are arranged an air cleaner 17, an air flow sensor 2, a compressor 6(b) of a supercharger, an intercooler 16, a throttle 13 adjusting an intake air amount, an intake port 20, and a fuel injection valve (hereinafter, refer to as an injector) 5, from an upstream side of the engine 19. An intake air amount control means in the present embodiment is constituted by the compressor 6(b) of the supercharger, the intercooler 16 and the throttle 13, and the intake air amount detecting means is constituted by the air flow sensor 2. The injector 5 is formed as a type of directly injecting a fuel to the combustion chamber 18. It is preferable that the throttle 13 is constituted by an electronic control throttle, and is structured such as to drive a throttle valve by an electric actuator. In the present embodiment, an intake air pressure sensor 14 is arranged in the intake port 20, and a preferable intake air amount control can be executed by detecting a pressure within the intake port 20. In an exhaust pipe, there are installed a λ sensor 3 measuring an air fuel ratio of an engine out, an EGR flow path 9 recirculating the exhaust gas to the intake port 20, an EGR cooler 10 and an EGR control valve 11. Further, in accordance with a feature of the present invention, an EGR flow rate sensor 12 detecting the EGR flow rate is arranged in the EGR flow path 9. In the present embodiment, the EGR flow rate sensor 12 is applied to a combustion control such as a premixed combustion mode, a switch between the premixed combustion mode and a diffusion combustion mode, and the like. In other words, since a detection period within at least one cycle is necessary for a response of the sensor 12 in various operating conditions, it is preferable to use a thermal type flow rate sensor and an electromagnetic type flow rate sensor. In this case, it goes without saying that the combustion control using the EGR flow rate sensor 12 can be applied to the diffusion combustion mode time. A predetermined fuel amount is injected from the injector 5 in correspondence to a target engine torque computed on the basis of an opening degree signal α of an accelerator opening degree sensor 1 or the like, and is appropriately compensated in correspondence to an opening degree signal θtp of the throttle 13, an opening degree signal θegr of the EGR control valve 11, a supercharging pressure Ptin of the compressor 6(b) of the supercharger, an output value of the λ sensor 3 and the like. In this case, the λ sensor 3 may employ various sensors such as an oxygen sensor, a C1 sensor or the like as far as the sensor can estimate a concentration of an oxygen within the cylinder.

Reference numeral 8 denotes an engine control unit (hereinafter, refer to as ECU). A combustion mode, a control amount and the like of the engine 19 are determined in accordance with a user demand such as an accelerator opening degree α, a brake state and the like, a vehicle state such as a vehicle speed and the like, and an engine operating condition such as an engine cooling water temperature, an exhaust gas temperature and the like.

Figure 2:
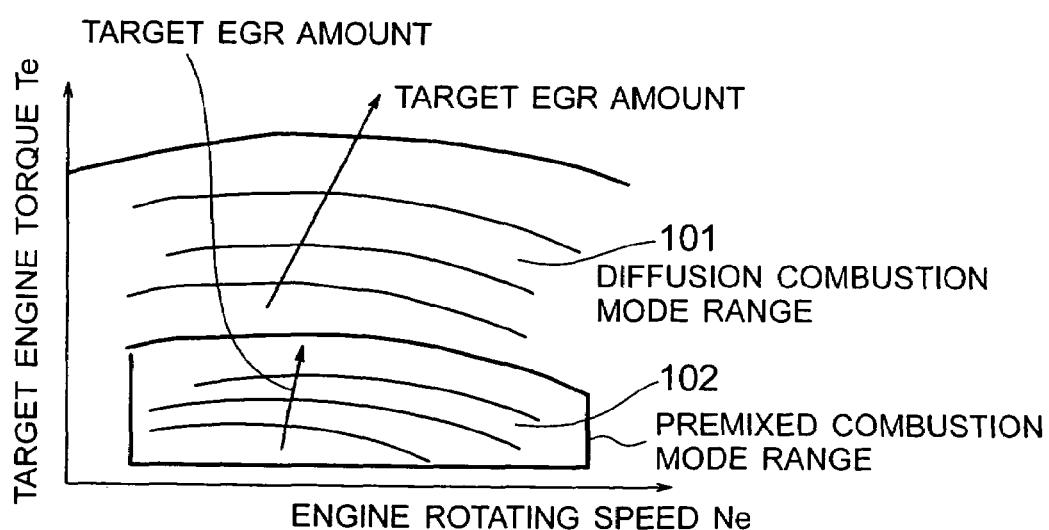
FIG. 2 is a conceptual diagram of an operating range and a target EGR amount of the engine in accordance with the first embodiment of the present invention.

FIG. 2 shows an operating range and a target EGR amount in view of a relation between an engine rotating speed and a target engine torque in the engine in accordance with the present invention. The engine 19 in accordance with the present invention has a premixed combustion mode range 102 starting the combustion after the end of the fuel injection to each of the cylinders, and a diffusion combustion mode range 101 starting the combustion during the fuel injection, and the control amount and the target value such as the target EGR amount and the like are previously stored in the ECU 8. The premixed combustion mode is achieved by quickening the fuel injection timing from the injector 5, a multistage injection (at least two times), comparatively increasing the EGR amount or the like. Accordingly, the operating range by the premixed combustion mode is limited such as the range 102. As a specific operating range, a low NOx operation on the basis of the premixed combustion mode can be executed until about one half of a full load in the engine torque, and until the engine operating range about 4000 rotations in the engine rotating speed. The target EGR amount in FIG. 2 tends to be reduced toward a direction of an arrow, however, comparing the premixed combustion mode range 102 with the diffusion combustion mode range 101, the target EGR amount in the premixed combustion mode range 102 is higher, and the target EGR amount neat a border line thereof becomes discontinuous. Accordingly, in switching the combustion mode, there are problems in the torque fluctuation and the exhaust gas deterioration generated at a time of passing through the discontinuous point, and it is necessary to apply a technique avoiding the problems. A solution of this point will be later described in detail by using FIG. 4 and so on.

Figure 3:
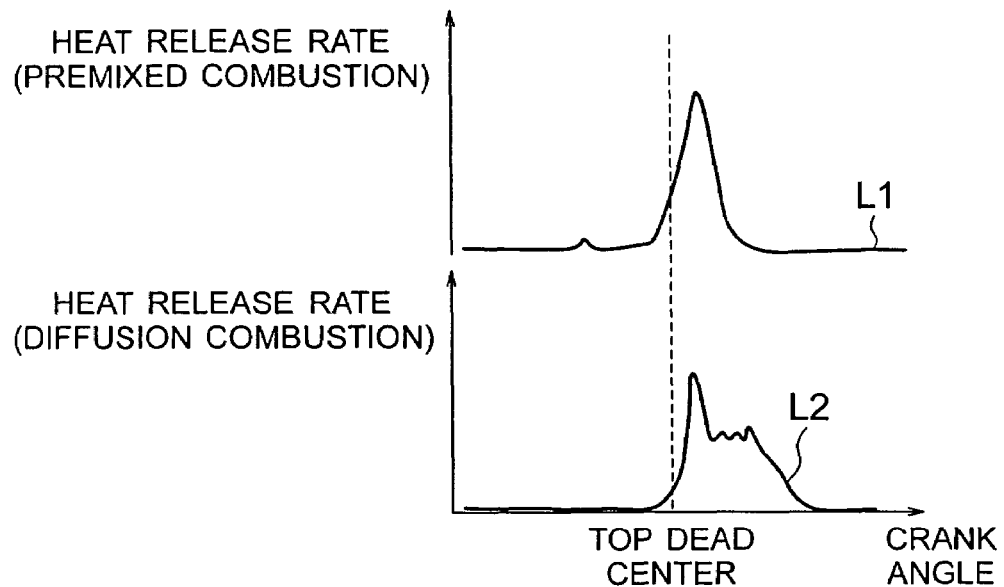
FIG. 3 is a heat release rate history in a premixed combustion mode and a diffusion combustion mode in the first embodiment in accordance with the present invention.

FIG. 3 shows a typical heat release rate history at a time of the premixed combustion mode and the diffusion combustion mode in the first embodiment of the present invention. A graph L2 in a lower stage shows a typical heat release in the diffusion combustion mode, which corresponds to a general diesel combustion. Near a top dead center, a partial fuel is premixed and a peak value of the heat release rate becomes comparatively higher, however, the injected fuel thereafter burns as it is. Accordingly, a table-shaped heat release history (a diffusion combustion history) is formed. On the other hand, in the premixed combustion mode in an upper state, the fuel is ignited and burns at a stroke near the top dead center after accompanying a slight heat release on the basis of a low temperature oxidation reaction before the top dead center. At this time, in order to preferably obtain a low NOx effect on the basis of the premixed combustion mode, it is necessary to finish the injection of all the fuel before igniting at a stroke, whereby an air-fuel mixture having a comparatively high uniformity coefficient is formed. Further, it is necessary to preferably control the ignition timing and the combustion period in accordance with the engine operating condition or the like. A description will be given below of the control method with reference to the drawings and the flows charts.

Figure 4:
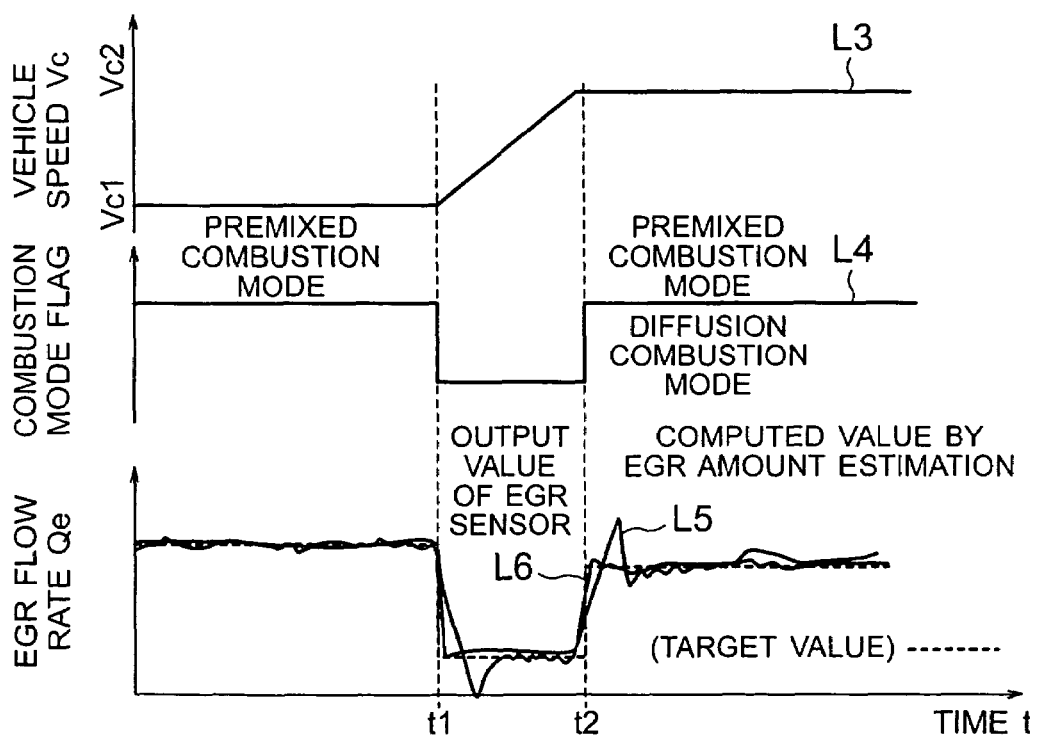
FIG. 4 is a view comparing an EGR flow rate detecting precision in the case of changing a vehicle speed so as to switch the combustion mode, in the first embodiment in accordance with the present invention.

FIG. 4 shows a chart which compares an EGR flow rate detecting precision in the case of switching the combustion mode, in the first embodiment in accordance with the present invention. This drawing compares the combustion mode state at a time of accelerating to Vc2 after steady traveling at a speed Vc1 of the vehicle mounting the engine 19 thereon, and thereafter steady traveling at the vehicle speed Vc2, and an EGR detection (estimation) state with respect to the target EGR amount. First, when the vehicle mounting the engine 19 thereon steady travels at the vehicle speed Vc1, the premixed combustion mode is selected in the engine 19 on the basis of a command from the ECU 8 as shown in FIG. 4. With respect to the target EGR amount at this time, there is no great difference between a graph L6 referring to an output value of the EGR flow rate sensor 12 corresponding to the system in accordance with the present invention, and the EGR flow rate value estimated from the value of the air flow sensor 2, the λ sensor 3 or the like as in the conventional structure, and there is obtained a state in which the combustion is stable. Next, in the case of accelerating the vehicle speed to Vc2 on the basis of an accelerator opening degree signal or the like from the user of the vehicle mounting the engine 19 thereon from this state, it is hard to control the ignition and combustion in the premixed combustion mode. Accordingly, the diffusion combustion mode is selected on the basis of the command from the ECU 8. In this case, in order to increase an air amount to the engine 19, the target EGR amount becomes a lower value in comparison with the target value at the premixed combustion mode, as in a lowest stage in FIG. 4. At this time, in a computation on the basis of the conventional EGR amount estimating logic, the estimated EGR amount graph L5 is greatly shifted from the target value at an early stage of switching the combustion mode. Therefore, since it is impossible to accurately detect the value detected by the air flow sensor 2 used in this system, and the amount of the air actually sucked into the engine 19 at the transient time as mentioned above, the EGR estimation value is shifted. On the other hand, since the EGR flow rate is directly detected, a volumetric capacity to the combustion chamber 18 of the engine 19 is small due to an installation to the EGR flow path 9, and a feedback period of the EGR flow rate is comparatively quick, the output value of the EGR flow rate sensor 12 takes up a value close to the target EGR value. It is possible to approximately suppress the exhaust gas deterioration and the torque fluctuation from the engine 19 on the basis of the effect. Next, in the case that the vehicle speed becomes constant at Vc2, and the steady travel is executed thereafter, there is again obtained an operation state in which the premixed combustion mode can be executed, on the basis of the reduction of the demand torque to the engine 19 or the like. Accordingly, if the premixed combustion mode is selected on the basis of the command from the ECU 8, the target EGR amount becomes larger in comparison with the accelerating time. At this time, in the same manner as the accelerating time mentioned above, in the computation on the basis of the conventional EGR amount estimating logic, the estimated EGR amount graph L5 is largely shifted from the target value at an early state of switching the combustion mode.

Further, in the switching from the diffusion combustion mode to the premixed combustion mode, since the displacement of the EGR amount greatly affects the combustion stability, a thereafter convergence state of the EGR amount is deteriorated because the combustion state changes hour by hour. On the other hand, the output value of the EGR flow rate sensor 12 takes up a value close to the target EGR amount in the same manner as the switching time mentioned above, and it is possible to approximately suppress the exhaust gas deterioration and the torque fluctuation from the engine 19. In other words, it is possible to particularly improve the combustion stability of the premixed combustion mode, and it is possible to further suppress the torque fluctuation and the exhaust gas deterioration at a time of switching the combustion mode, in the diesel engine, by directly detecting the EGR flow rate and controlling the combustion state on the base of this value.

Figure 5:
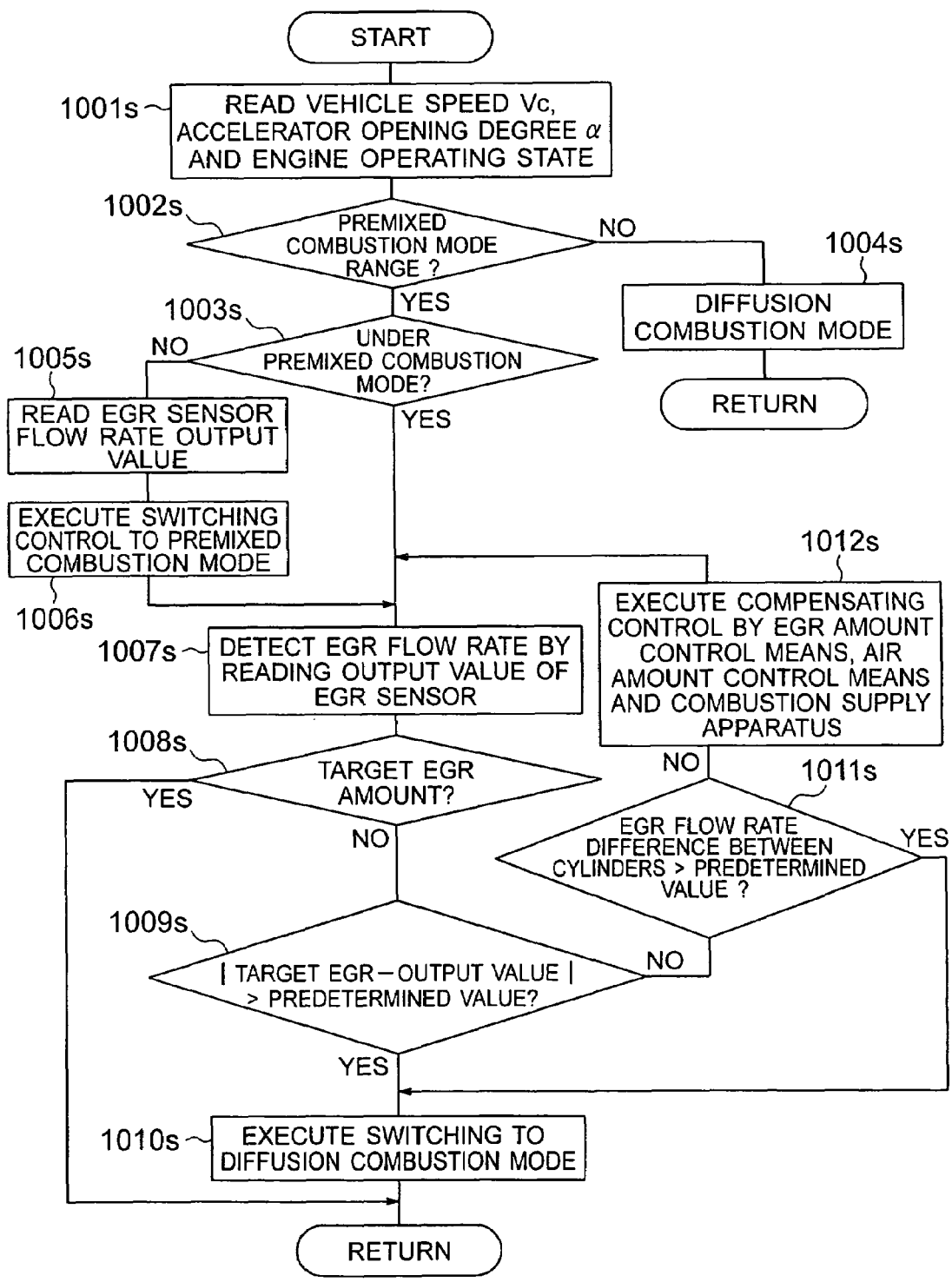
FIG. 5 is an example of a control flow chart at a time of the premixed combustion mode in the first embodiment in accordance with the present invention.

FIG. 5 shows an example of a control flow chart at a time of the premixed combustion mode, in the first embodiment in accordance with the present invention. As a flow controlling the premixed combustion mode in the present embodiment, first, in a block 1001s, the step reads the speed Vc of the vehicle mounting the engine 19 thereon, the accelerator opening degree α, the engine operating state and the like, and judges whether or not the engine operation in accordance with the premixed combustion mode can be executed (a block 1002s). If it does not exist in the range, the step selects or continue the normal diffusion combustion mode (a block 1004s). In the case that the operation can be executed, the step judges whether or not the present time is under the operation in accordance with the premixed combustion mode (a block 1003s), and if it is under the operation, the step goes to a block 1007s. In the case that it is not under the operation, the step goes to a block 1005s so as to read the output value of the EGR flow rate sensor 12, controls the throttle 13, the EGR control valve 11, the compressor 6(b) of the supercharger, the injector 5, the fuel pump 15 and the like in accordance with the command of the ECU 8 on the basis of the output value, and executes the switching control to the premixed combustion mode (a block 1006s). Next, in a state in which the operation in accordance with the premixed combustion mode is continued, the step reads the output value of the EGR flow rate sensor 12 in the block 1007s so as to detect the current EGR flow rate. The step judges in a block 1008s whether or not the current EGR flow rate corresponds to the target EGR amount, and in the case that it is different, the step judges whether or not the difference between the target EGR amount and the output value is equal to or more than a predetermined value (a block 1009s). In the case that the difference is equal to or more than the predetermined value, the engine control amount and the target EGR amount are widely different, and there can be considered a state in which the device is deteriorated, the fuel component is dispersed, or the like. Accordingly, since it is hard to stably control the premixed combustion mode, the step executes the switching to the diffusion combustion mode (a block 1010s). In the case that the difference is within a predetermined range, the step estimates the EGR amount in each of the cylinders on the basis of the signal process of the output value, and judges whether or not the flow rate difference between the cylinders is equal to or more than the predetermined value (a block 1011s). In the case that the flow rate difference between the cylinders is equal to or more than the predetermined value, it is judged that it is hard to continue the stable premixed combustion mode even if the combustion injection control or the like is executed in each of the cylinders. Accordingly, in the same manner as mentioned above, the step goes to a block 1010s and executes the switching to the diffusion combustion mode. In the case that the flow rate difference between the cylinders is within the predetermined range, the step goes to a block 1012s, and executes a compensation control such that the EGR flow rate difference between the cylinders is reduced, by using the throttle 13, the EGR control valve 11, the compressor 6(b) of the supercharger, the injector 5, the fuel pump 15 and the like. Accordingly, the engine 19 is controlled in such a manner as to obtain the stable premixed combustion mode.

Figure 6:
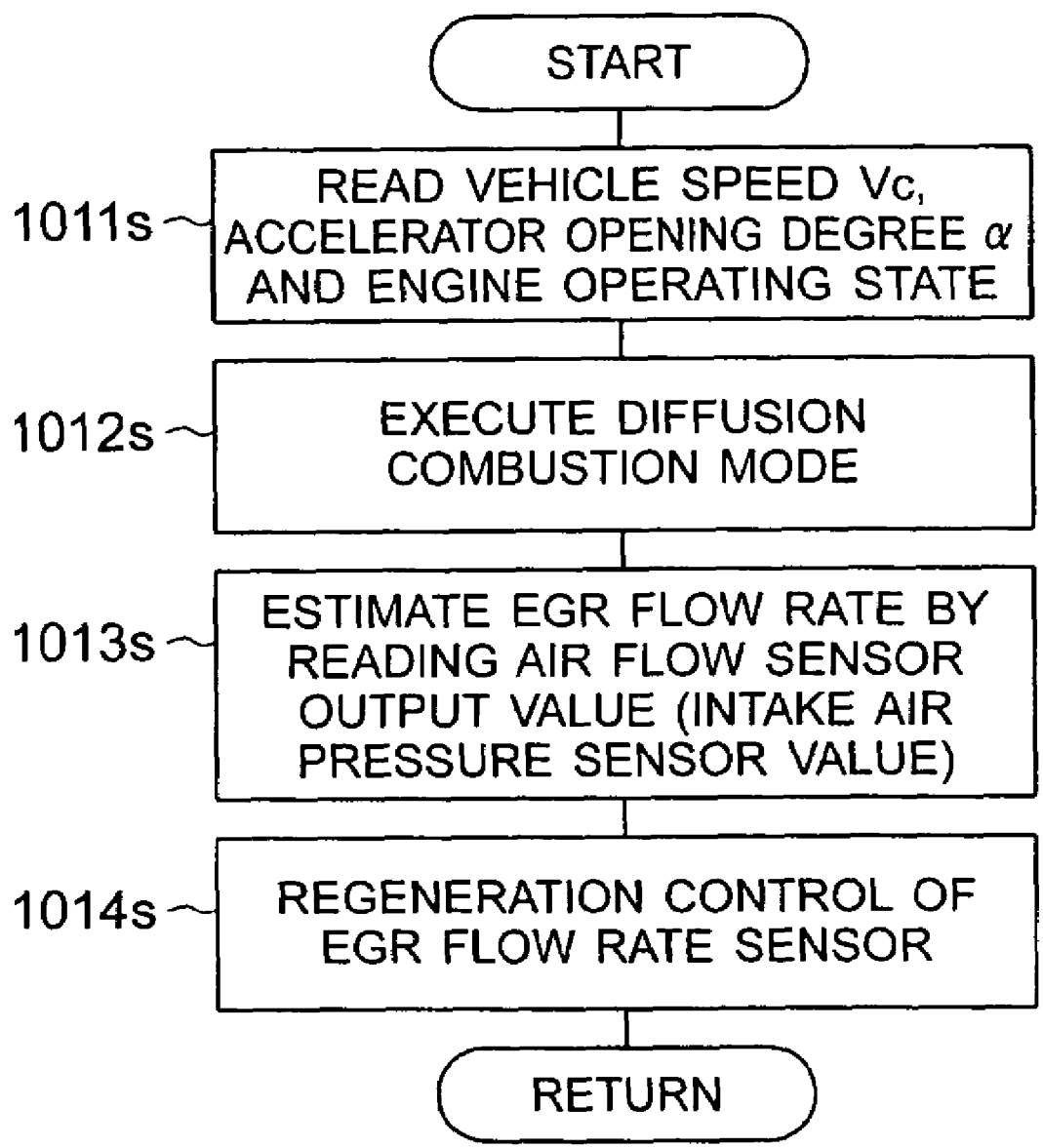
FIG. 6 is an example of a control flow chart in the case of regeneration controlling an EGR flow rate sensor, in the first embodiment in accordance with the present invention.

FIG. 6 shows an example of a control flow chart in the case of regeneration controlling the EGR flow rate sensor. Since the EGR flow path 9 corresponds to a path through which the exhaust gas recirculates, the EGR flow rate sensor 12 is under an environment of being polluted and deteriorated. Accordingly, since there is a risk that a detection precision of the EGR flow rate is lowered, it is necessary to execute the regeneration control as shown in FIG. 6. First, in a block 1011s, the step reads the vehicle Vc of the vehicle mounting the engine 19 thereon, the accelerator opening degree α, the engine operating state and the like, and controls the engine in such a manner as to obtain the diffusion combustion mode (a block 1012s). At this time, when the engine 19 is steady operated, there is no risk that the exhaust gas deterioration or the like is generated even by the conventional EGR estimating method, as shown in FIG. 4. Accordingly, the step executes the EGR flow rate estimation by the air flow sensor or the like (a block 1013s) and continues the engine operation. Thereafter, the step executes the regeneration control of the EGR flow rate sensor 12 (a block 1014s). In the case of employing, for example, a thermal type flow rate sensor, the regeneration control heats a hot wire in an element portion detecting the flow rate on the basis of a self current application, and removes the attached dust, oil or the like. Accordingly, in a condition in which the EGR detecting precision is necessary, it is possible to execute the combustion control using the EGR flow rate sensor, and it is possible to secure a long-time durability.

Figure 7:
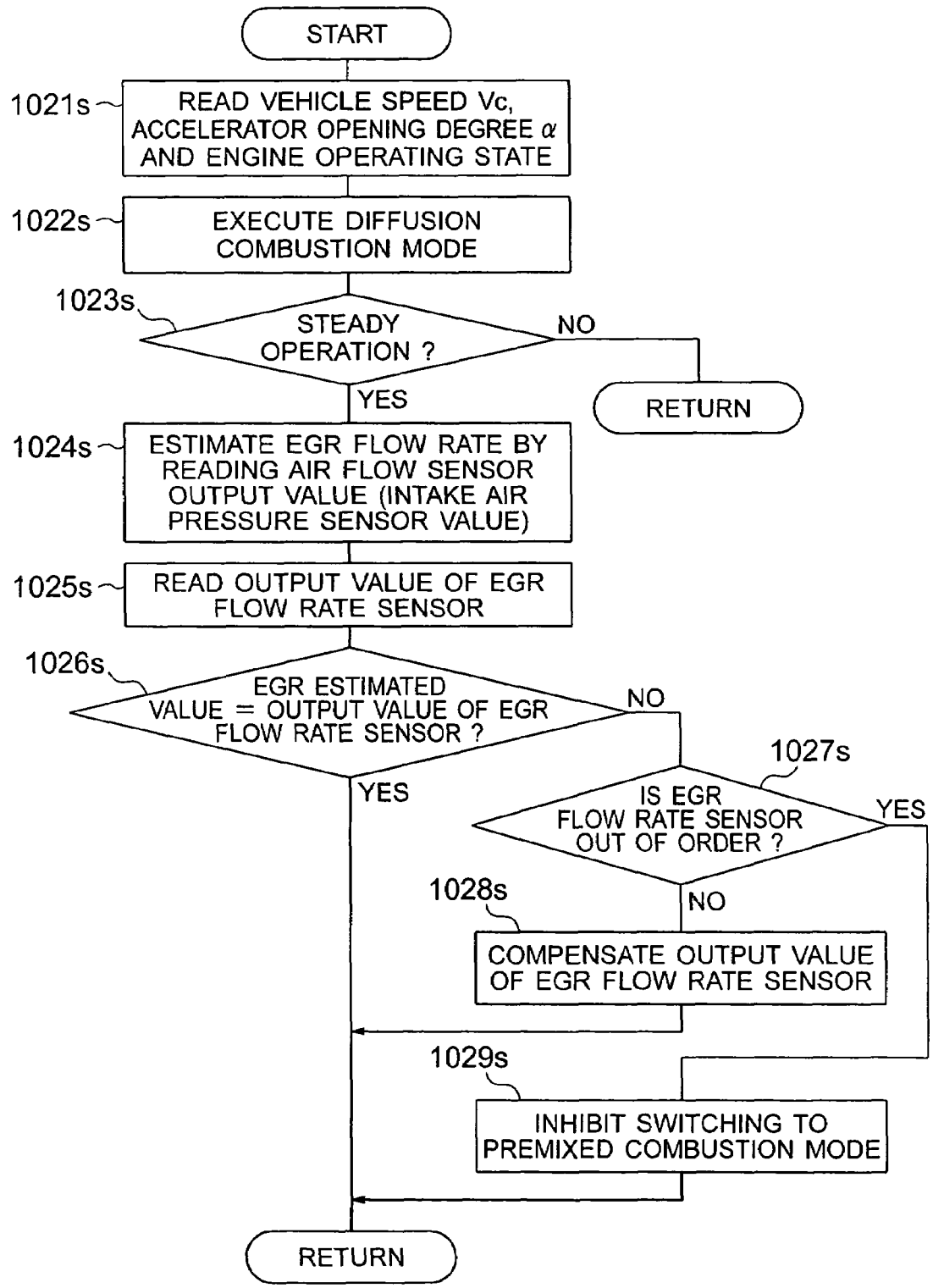
FIG. 7 is an example of a control flow chart in the case of compensating an output and detecting a failure of the EGR flow rate sensor, in the first embodiment in accordance with the present invention.

FIG. 7 shows one example of a control flow chart in the case of compensating an output and detecting a failure in the EGR flow rate sensor. In the same manner as the case in FIG. 6, the steady operation in accordance with the diffusion combustion mode is executed between blocks 1021s and 1024s. Thereafter, the step reads the output value of the EGR flow rate sensor 12 (a block 1025s), and compares the EGR estimated value estimated by the other sensor with the output value (a block 1026s). In the steady condition of the diffusion combustion mode, since the precision of the EGR estimated value is secured, as shown in FIG. 4, it is possible to judge the pollution and the deterioration of the EGR flow rate sensor 12, and further the failure thereof, on the basis of the comparison of the values. In the case that the compared value in the block 1026s is different, the step judges the failure on the basis of the output wave form (a block 1027s). Since it is hard to executed the precise EGR control at the transient time, in the case of the output state judged as the failure, the step inhibits the switching to the premixed combustion mode (a block 1029s). Further, in a state in which the output value is offset or the like although it is not the failure, the step compensates the output value of the EGR flow rate sensor 12 on the basis of the comparison with the estimated value, and sets the value to an output value used for the combustion control including the future premixed combustion mode (a block 1028s). It is possible to diagnose the state of the EGR flow rate sensor 12 under the polluted environment and further compensate it on the basis of these flows, and it is possible to assure the operation in accordance with the premixed combustion mode long.

Figure 8:
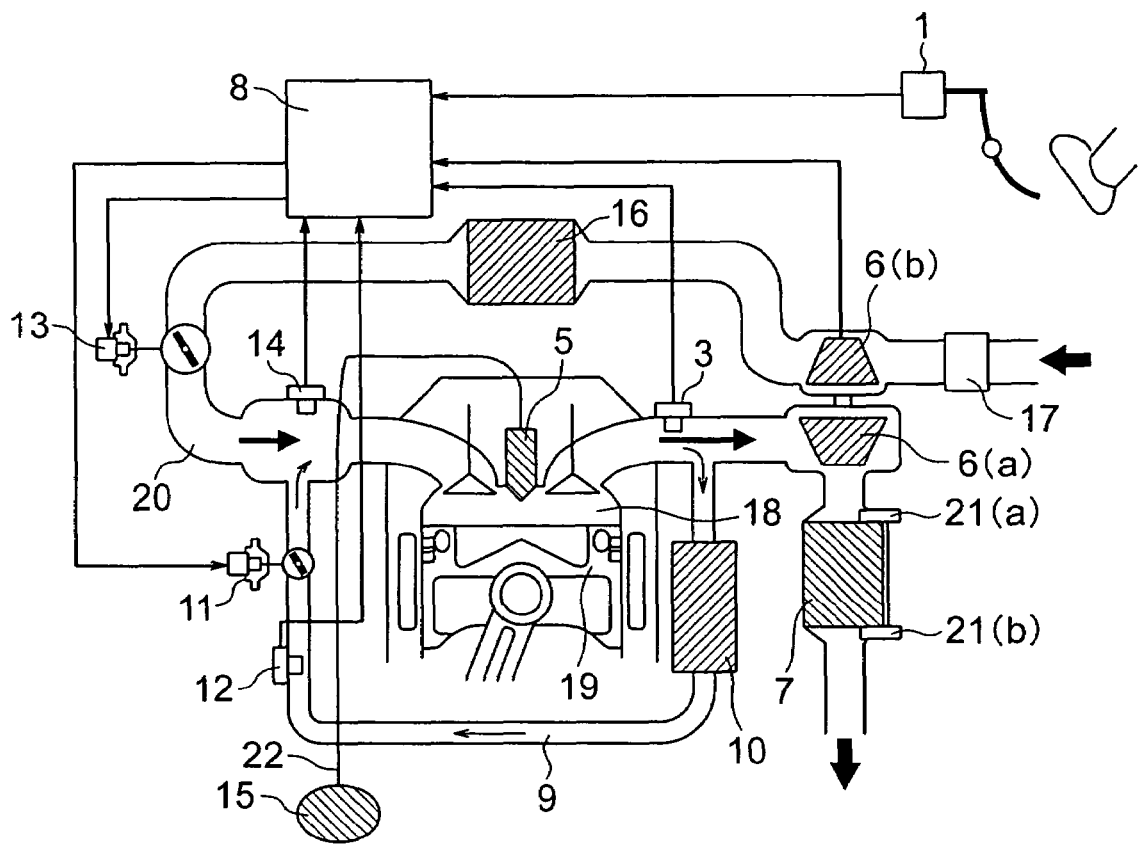
FIG. 8 is a structural view of a control apparatus of an engine in accordance with a second embodiment of the present invention.

FIG. 8 shows a structural view of a control apparatus of an engine in accordance with a second embodiment of the present invention. A difference from the structure employed in the first embodiment exists in a matter that the air flow sensor 2 in FIG. 1 is not provided. In other words, the premixed combustion mode and the diffusion combustion mode are controlled by the EGR flow rate sensor 12. Basically, the combustion control by the EGR flow rate sensor achieves a stable combustion control in the transient state, by using the flow rate sensor near the combustion chamber 18 of the engine 19. It goes without saying that in the steady state, it is possible to control on the basis of the value of the intake air pressure sensor 14, and it is possible to control the combustion even at the steady time by the EGR flow rate sensor 12. Accordingly, it is possible to achieve a low cost of an entire of the system without the air flow sensor 2, and it is possible to intend to simplify the system.

Further, even if the EGR flow rate sensor 12 in accordance with the present invention is arranged in a downstream side of the EGR control valve 11 or in an upstream side of the EGR cooler 10, the same effects as those of the present embodiment can be achieved.

As mentioned above, in accordance with the control apparatus of the engine in accordance with the present invention, in the engine having the premixed combustion mode starting the combustion after the end of the fuel injection to each of the cylinders of the engine, and the diffusion combustion mode starting the combustion during the fuel injection, since the EGR amount detecting means is arranged in the EGR flow path, and it is possible to detect the EGR amount directly and at the position close to the combustion chamber, by estimating the cylinder state of the engine by using the output value, preferably executing the EGR control on the basis of the output value, in the case that the engine is under the premixed combustion mode, the EGR flow rate detecting precision is improved, and it is possible to preferably control the ignition combustion state at a time of the premixed combustion mode. Further, it is preferable to use the thermal type flow rate sensor as the EGR flow rate detecting means, in the light of the response and the pollution resistance.

Further, preferably, the present invention is characterized by inhibiting the flow rate detection on the basis of the output of the EGR flow rate detecting means at a time of the general diffusion combustion mode, and executing the EGR flow rate estimation using the intake air flow rate detecting means such as the air flow sensor or the like during this time, and the compensation of the output of the EGR flow rate detecting means. Accordingly, it is possible to keep a durability for a long time under the EGR ambient atmosphere which tends to be polluted in comparison with the air environment, while securing the precision of the EGR flow rate detecting means at a time of the premixed combustion mode.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus of an engine comprising:
an intake air amount control means for controlling an air amount sucked into the engine;

an EGR flow path coupled to a portion between an exhaust passage and an intake passage of said engine and provided for flowing back a part of an exhaust gas;

an EGR amount detecting means for detecting an EGR amount passing through said EGR flow path;

an EGR amount control means for controlling the EGR amount passing through said EGR flow path;

a fuel supply apparatus supplying a fuel into said engine;

a premixed combustion mode starting a combustion after finishing a fuel injection into each of cylinders of said engine; and a diffusion combustion mode starting the combustion during the fuel injection, wherein the control apparatus estimates a cylinder state of said engine on the basis of an output value of said EGR amount detecting means, at a time when said engine is under the premixed combustion mode.

2. A control apparatus of an engine comprising:

an intake air amount control means for controlling an air amount sucked into the engine;

an intake air amount detecting means for detecting the air amount sucked to said engine;

an EGR flow path coupled to a portion between an exhaust passage and an intake passage of said engine and provided for flowing back a part of an exhaust gas;

an EGR amount detecting means for detecting an EGR amount passing through said EGR flow path;

an EGR amount control means for controlling the EGR amount passing through said EGR flow path;

a fuel supply apparatus supplying a fuel into said engine;

a premixed combustion mode starting a combustion after finishing a fuel injection into each of cylinders of said engine; and a diffusion combustion mode starting the combustion during the fuel injection, wherein the control apparatus estimates a cylinder state of said engine on the basis of an output value of said EGR amount detecting means, at a time when said engine is under the premixed combustion mode.

3. A control apparatus of an engine as claimed in claim 1, wherein when said engine is in the premixed combustion mode, the control apparatus estimates a cylinder state of said engine on the basis of an output value of said EGR amount detecting means, and controls a combustion state of said engine by using said intake air amount control means, said EGR amount control means, and said fuel supply apparatus.

4. A control apparatus of an engine as claimed in claim 2, wherein when said engine is in the premixed combustion mode, the control apparatus uses an output value of said intake air amount detecting means.

5. A control apparatus of an engine as claimed in claim 1, wherein when said engine is in the diffusion combustion mode, the control apparatus uses an output value of said EGR amount detecting means.

6. A control apparatus of an engine as claimed in claim 1, wherein when said engine is in the diffusion combustion mode, the control apparatus executes a diagnosis of said EGR amount detecting means.

7. A control apparatus of an engine as claimed in claim 2, wherein when said engine is in the diffusion combustion mode, the control apparatus executes a compensation of an output value of said EGR amount detecting means on the basis of an output of said intake air amount detecting means.

8. A control apparatus of an engine as claimed in claim 1, wherein when said engine is switched to the premixed combustion mode from the diffusion combustion mode, the control apparatus estimates a cylinder state of said engine on the basis of an output value of said EGR amount detecting means.

9. A control apparatus of an engine as claimed in claim 1, wherein when said engine is switched to the premixed combustion mode from the diffusion combustion mode, the control apparatus estimates a cylinder state of said engine on the basis of an output value of said EGR amount detecting means, and controls a combustion state of said engine by using said intake air amount control means, said EGR amount control means and said fuel supply apparatus.

10. A control apparatus of an engine as claimed in claim 2, wherein when said engine is switched to the premixed combustion mode from the diffusion combustion mode, the control apparatus estimates a cylinder state of said engine on the basis of both of an output value of said intake air amount detecting means and an output value of said EGR amount detecting means, and controls a combustion state of said engine by using said intake air amount control means, said EGR amount control means, and said fuel supply apparatus.

11. A control apparatus of an engine as claimed in claim 1, wherein in the case that an EGR amount of each of the cylinders is computed to be out of a predetermined range on the basis of an output value of said EGR amount detecting means, at a time when said engine is in the premixed combustion mode, the control apparatus switches to the diffusion combustion mode from the premixed combustion mode.

12. A control apparatus of an engine as claimed in claim 1, wherein in the case that a difference between the EGR amounts of the cylinders is computed to be out of a predetermined range on the basis of an output value of said EGR amount detecting means, at a time when said engine is in the premixed combustion mode, the control apparatus switches to the diffusion combustion mode from the premixed combustion mode.

13. A control apparatus of an engine as claimed in claim 1, wherein in the case that said EGR amount detecting means is judged to be out of order, the control apparatus inhibits the switching from the diffusion combustion mode to the premixed combustion mode.

14. A control apparatus of an engine as claimed in claim 1, wherein in the case that said EGR amount detecting means is judged to be out of order, the control apparatus inhibits the continuation of the premixed combustion mode.

15. A control apparatus of an engine as claimed in claim 1, wherein said EGR amount detecting means is installed in said EGR flow path.

16. A control apparatus of an engine as claimed in claim 1, wherein said EGR amount detecting means is constituted by a thermal type flow rate sensor installed in said EGR flow path.

17. A control apparatus of an engine as claimed in claim 1, wherein said EGR amount detecting means is constituted by an electromagnetic flow rate sensor installed in said EGR flow path.

18. A control apparatus of an engine as claimed in claim 1, wherein said EGR amount detecting means is constituted by a pressure sensor installed in said EGR flow path.

* * * * *